Oct. 10, 1950     C. F. DUNN     2,525,289

SPINNING TYPE CASTING REEL

Filed Feb. 7, 1949

INVENTOR.
Clarence F. Dunn
BY
Fred C. Matheny
ATTORNEY

Patented Oct. 10, 1950

2,525,289

UNITED STATES PATENT OFFICE 2,525,289

SPINNING TYPE CASTING REEL

Clarence F. Dunn, Seattle, Wash.

Application February 7, 1949, Serial No. 74,899

4 Claims. (Cl. 242—84.1)

This invention relates to a fishing reel of the type known as a spinning type casting reel.

In reels of this type the spool which carries the line is supported by pivotal mounting means from the handle portion of a casting rod so that the spool can be moved between a casting position in which its axis is substantially parallel to the axis of the rod and a winding position in which its axis is substantially at right angles to the axis of the rod, and said spool is unobstructed at one end, and during the casting operation said spool is positioned with its axis substantially parallel to the axis of the rod so that the line comes off of the spool over the unobstructed end of the spool without rotating the spool and with substantially no frictional resistance. This makes it possible to cast a lure a long distance with great ease and accuracy.

It is an object of this invention to provide a spinning type casting reel having a mounting bracket which is provided with a finger piece positioned for convenient engagement by a finger of the user when the spool is in casting position so that the spool can be firmly held in the casting position with its axis substantially parallel to the axis of the rod during the casting operation.

Other objects of this invention are to provide a spinning type casting reel and mounting means therefor which are strong, simple and durable in construction, reliable and efficient in operation, neat in appearance and not expensive to manufacture.

Other objects of the invention will be apparent from the following description taken in connection with the accompanying drawings.

In the drawings Figure 1 is an elevational view showing a fragment of a rod with this spinning type casting reel mounted thereon, showing the manner of grasping the rod and the line and a finger piece on a mounting member of the reel to hold the reel in a proper position while casting.

Like reference numerals designate like parts throughout the several views.

Figure 1:
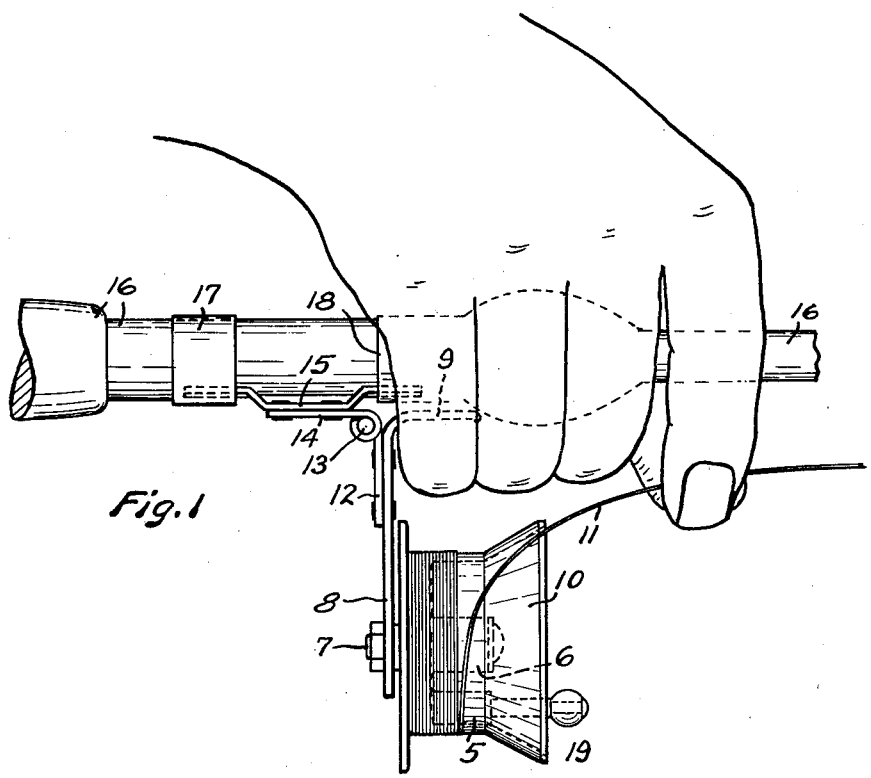

This spinning reel comprises a spool 5 having a hub portion 6 which is rotatively mounted on a bearing post 7. If desired ball bearings may be used in the mounting of the spool 5. The bearing post 7 is fixedly secured to a spool supporting bracket 8. The spool supporting bracket 8 has a finger piece 9 formed on the end thereof remote from the bearing post 7, as by bending the end portion of said bracket 8 toward the spool until it is substantially at right angles to the main portion of the bracket. Thus the bracket 8 and finger piece 9 are of substantially L shape.

The forward end portion of the spool 5 is in the shape of an expanding cone 10 and said forward end portion is unobstructed and clear of the mounting means so that a fishing line 11 can come off freely over this cone shaped end 10.

A hinge member 12 is secured to the reel supporting bracket 8 and is connected by a pivot member 13 with another hinge member 14. The hinge member 14 is secured to a rod engaging bracket 15 of conventional form. The end portions of the rod bracket 15 are adapted to be secured to the handle portion of a casting rod 16, as by keeper members 17 and 18. The hinge members 12 and 14 are shown as separate pieces of metal fixedly secured to the brackets 8 and 15 respectively but it will be understood that hinge members to receive the pivot member 13 may be formed integral with the brackets 8 and 15.

The pivot member 13 is positioned to one side of the rod 16 with its axis substantially at right angles to the axis of the rod 16. The spool 5 is thus pivotally movable about an axis which does not pass through either the spool 5 or the rod 16. Preferably the hinge members 12 and 14 fit the pivot 13 snugly to thereby provide a pivotal mounting having enough friction so that the spool 5 will be restrained from swinging back and forth by gravity but can readily be moved between its two operative positions.

Figure 2:
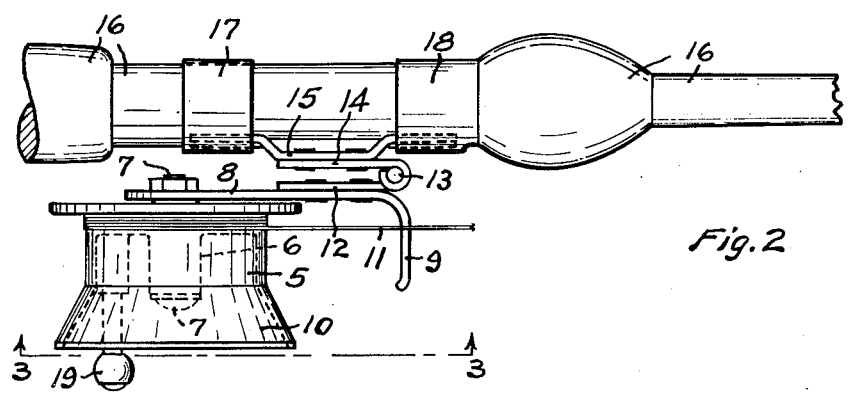
Fig. 2 is an elevational view of the reel and a fragment of a rod and showing the reel in a correct position for winding in the line.
Figure 3:
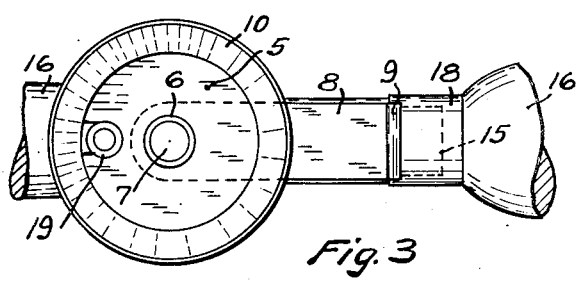
Fig. 3 is a view in elevation looking in the direction of broken line 3—3 of Fig. 2.

When the reel is to be used for winding in the line 11 the spool 5 may be moved to the position shown in Fig. 2. The user can then hold the reel in the winding position and wind in the line by taking hold of a handle 19 on the spool 5.

When a line with a lure on the outer end thereof is to be cast the spool 5 is moved into substantially axial alignment with the rod 16 with the finger piece 9 positioned alongside of the rod, as shown in Fig. 1. The rod 16 is grasped in the hand so that the fourth or little finger engages with the finger piece 9 and holds the spool 5 in substantially axial alignment with the rod while the cast is being made.

Before the user of this reel starts to make a cast he will position the spool as shown in Fig. 1 and will preferably grasp the line 11 between the thumb and the finger adjacent the location where the line comes off of the reel. With the line 11 and the finger piece 9 held by the hand, as above described, the user will swing the rod first rearwardly and then forwardly in making the cast. The grip of the line by the thumb and forefinger prevents the line from feeding out as the rod 16 is being swung rearwardly and as said rod is being swung forwardly on the first part of the forward stroke. About mid way of the forward swing or stroke of the rod 16 the grip of the thumb and finger on the line 11 is released and the line is allowed to come off over the end of the spool 5 and feed out along the rod 16 in the usual manner.

The function of the finger piece 9 is particularly important in making it possible to hold the spool 5 in substantially axial alignment with the rod near the end of the forward casting stroke and while the momentum of the swinging rod is being checked. It will be understood that, as the rod is being brought to rest at the end of the cast the inertia of the moving reel will tend to swing said reel back toward the position which it is shown in Fig. 2. The grip on the finger piece 9 prevents this displacement of the reel at this time.

The line passes off of the end of the spool without rotating the same. Consequently there is no friction and inertia of the spool to be overcome and the line runs out very freely and smoothly and the possibility of tangling of the line due to over running of the reel is substantially eliminated. Also longer and more accurate casts of the line are made possible.

After a cast has been made the spool can be returned to the position in which it is shown in Fig. 2, in which position it can be used in the usual manner until another cast is to be made.

The foregoing description and accompanying drawings clearly disclose a preferred embodiment of my invention but it will be understood that this disclosure is merely illustrative and that changes may be made within the scope of the following claims.

I claim:

1. In a spinning type casting reel for use on a casting rod, a spool supporting bracket; a spool rotatively mounted on one end portion of said spool supporting bracket on an axis substantially perpendicular to the bracket; pivot means connecting the other end portion of said spool supporting bracket with the handle portion of a casting rod; and a finger piece carried by said bracket adjacent said pivot means, said finger piece extending approximately at right angles to said bracket in the direction of the spool and alongside of the spool and in spaced relation from the spool.

2. In a spinning type casting reel for use on a casting rod, a spool supporting bracket; a spool rotatively mounted on one end portion of said spool supporting bracket on an axis substantially perpendicular to the bracket; pivot means connecting the other end portion of said spool supporting bracket with the handle portion of a casting rod, said pivot means being positioned alongside of the rod at approximately right angles to the rod and said spool supporting bracket and said spool being movable on said pivot means between a position in which the axis of the spool is substantially parallel to the rod and a position in which the axis of the spool is substantially at right angles to the axis of the rod; and a finger piece on the pivotally mounted end portion of said spool supporting bracket and positioned substantially at right angles thereto, said finger piece being disposed alongside of the handle portion of the rod when the axis of the spool is substantially parallel with the rod, whereby the rod and finger piece can be simultaneously grasped and held during a casting operation.

3. In a spinning type casting reel for use on a casting rod, a spool supporting bracket; a spool rotatively mounted on one end portion of said spool supporting bracket on an axis substantially perpendicular to the bracket; a rod bracket adapted to be attached to the handle portion of a casting rod parallel with the rod; pivot means connecting an end portion of said spool supporting bracket with said rod bracket, said pivot means being positioned alongside of said rod bracket crosswise thereof and said spool supporting bracket and spool being swingingly movable on said pivot means between a position in which the axis of the spool is substantially parallel to the rod bracket and a position in which the axis of the spool is substantially at right angles to the rod bracket; and a finger piece on the pivotally mounted end portion of said spool supporting bracket positioned substantially at right angles to the spool supporting bracket and substantially parallel to the axis of said spool and extending in the same direction as said spool in spaced relation from the spool, whereby said finger piece will be positioned alongside of a rod when said rod bracket is attached to a rod and the spool is substantially parallel to the rod.

4. In a spinning type casting reel for use on a casting rod, a spool supporting bracket; a spool rotatively mounted on one end portion of said spool supporting bracket on an axis substantially perpendicular to the bracket; a rod bracket adapted to be attached to the handle portion of a casting rod parallel with the rod; a hinge connecting an end portion of said spool supporting bracket with said rod bracket for swinging movement of the two brackets relative to each other between a position substantially parallel to and alongside of each other and a position substantially at right angles to each other; and a finger piece rigid with the pivotally mounted end portion of said spool supporting bracket and substantially parallel to the axis of said spool and extending in the same direction as said spool in spaced relation from said spool, whereby said finger piece will be positioned alongside of the handle portion of a casting rod when the rod bracket is attached to the rod and the axis of the spool is substantially parallel to the rod.

CLARENCE F. DUNN.

REFERENCES CITED

The following references are of record in the file of this patent:

FOREIGN PATENTS

| Number | Country | Date |
|---|---|---|
| 203,892 | Switzerland | July 1, 1939 |